UNITED STATES PATENT OFFICE.

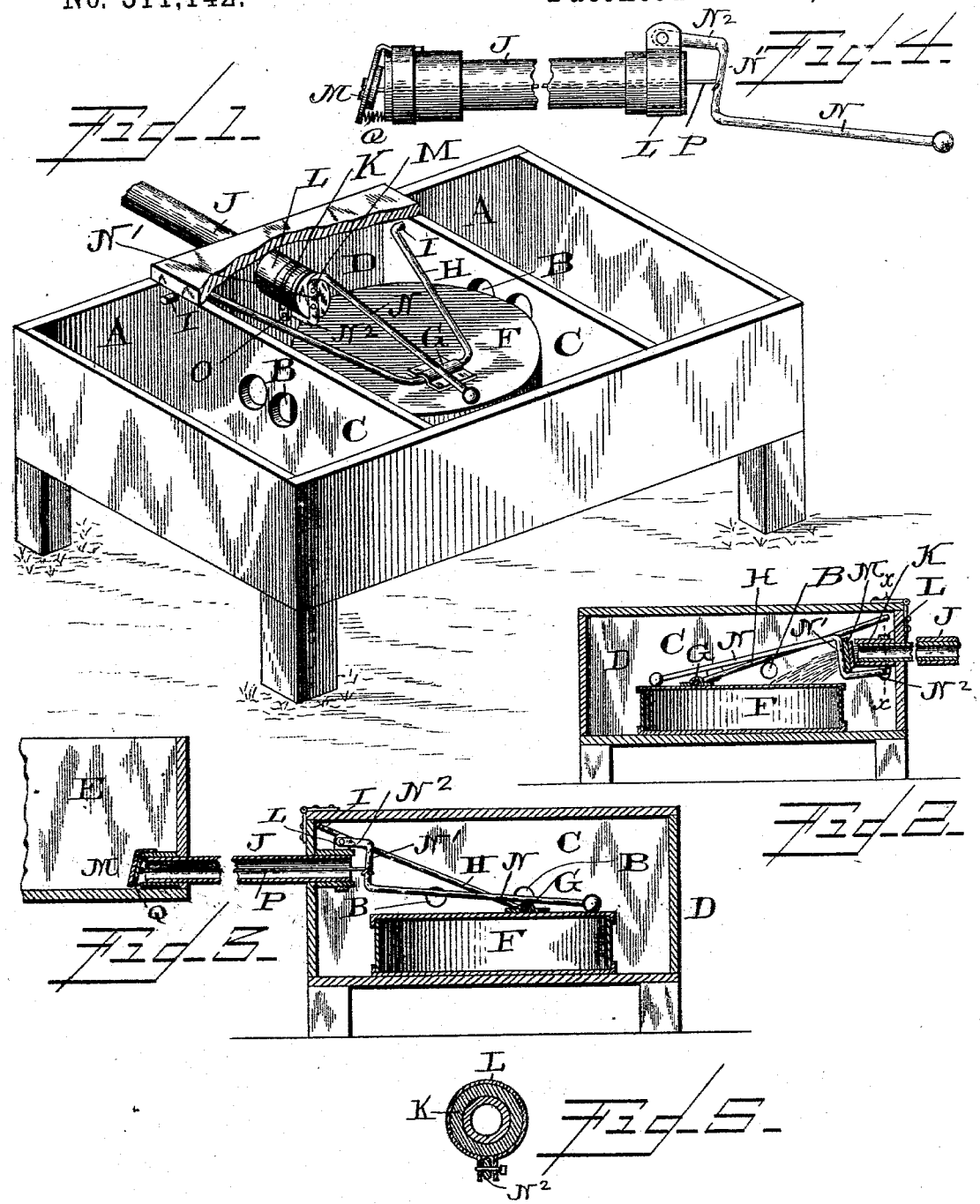

GEORGE A. HESS, OF MAQUOKETA, IOWA.

TROUGH FOR WATERING STOCK.

SPECIFICATION forming part of Letters Patent No. 511,142, dated December 19, 1893.

Application filed December 9, 1892. Serial No. 454,632. (No model.)

*To all whom it may concern:*

Be it known that I, GEORGE ADAM HESS, a citizen of the United States, and a resident of Maquoketa, in the county of Jackson and State of Iowa, have invented certain new and useful Improvements in Troughs for Watering Stock; and I do hereby declare that the following is a full, clear, and exact description of the invention, which will enable others skilled in the art to which it appertains to make and use the same, reference being had to the accompanying drawings, which form a part of this specification, and in which—

Figure 1 is a perspective view of my improved trough for watering stock, the top part or cover of the middle section having been removed so as to show the automatic cut-off with its float. Fig. 2 is a transverse sectional view on a vertical plane through the middle of the automatic cut-off. Fig. 3 is a similar view, showing a modified construction of the cut-off. Fig. 4 is a side view of the feed-pipe and cut-off shown in section in Fig. 3; and Fig. 5 is a cross section through the inner end of the feed-pipe, with its clamp and packing, on line $x$—$x$ in Fig. 2.

Like letters of reference denote corresponding parts in all the figures.

This invention relates to that type of troughs or tanks for watering live stock which are provided with an automatic cut-off operating in conjunction with the feed-pipe so as to cut off the inflow of the water when the trough is full and thus prevent waste by overflow; the inflow or feed-pipe opening again automatically when the water sinks below a certain level; and my improvement consists in the construction and combination of parts of the automatic cut-off device, as will be hereinafter more fully described and claimed.

Referring to the drawings, the letters A A designate two parts or sections of a watering tank or trough, which communicate through apertures B in the partitions C C with the central compartment D, which receives the inflow of water from a suitably located reservoir E, and in which the cut-off mechanism is arranged. The supply reservoir may be located at any desired distance from the watering device, and the latter may have any desired number of watering troughs or compartments A, communicating with one another through apertures in the walls or partitions separating them.

Placed within the compartment D (which by the way, is not necessarily in the middle of the device, but may be located at either end thereof, or at any other convenient point) is a float F, which is hinged, at G, upon a bail H, the ends of which are articulated to the wall of the compartment at I I, thus giving to the float a free up and down motion, guided by the bail to which it is attached movably. The inflow pipe or feed pipe J, leading from the reservoir or supply tank, projects into the float compartment D, and is surrounded by a rubber packing, K, held in place upon the pipe by a clamp, L, and projecting slightly over the inner end or outlet of the pipe, so as to face and form a water-tight annular packing against the regulating valve M. This valve or cut-off is fastened upon that part or portion, N', of an arm or lever N, which is bent at right angles, the lower part of said arm $N^2$, being again bent at right angles and articulated upon the bolt, O, which connects the ends of clamp L, so that said bolt will form a fulcrum for the bent lever $N^2$ N' N, from which it follows that when the long arm N is moved in an upward direction, valve M will be seated against the annular packing of pipe J and thus close the same and cut off the inflow of water. As arm N projects over the middle part of the float, it will be lifted when the float rises, while, on the other hand, when float F sinks, it will fall with the float by its own gravity and thus open the valve. To insure the prompt opening of valve M when the float is lowered, arm N may be provided with a weight at its outer end, or it may be connected by a spring, O, with the bottom of the trough.

From the foregoing description taken in connection with the drawings, the operation of this device will be readily understood. As water runs through pipe J into the receiving compartment D, and from it through the apertures B into the adjacent compartments or troughs at which the stock is watered, the float F will rise gradually, lifting with it lever N and thus gradually seat the valve against the packed mouth of the inflow pipe. When the water has reached the highest desirable level, the float will have risen so high as to press the valve against the mouth of the inflow pipe with sufficient pressure to close this and cut off the water. But as the water in the side tank or trough is gradually consumed, the level of water in the float compartment will be lowered, the float will sink, and with it the lever N, so as to partially and gradually reopen the valve. This lets in more water until the maximum level has been re-established, when water is again cut off automatically, and so on; so that by alternately opening and closing the valve, the water in the troughs will always be maintained at the same level, while, at the same time, there will be absolutely no waste of water by overflow.

In northern latitudes, where the water standing in the feed-pipe leading from the reservoir would be apt to freeze, when not running, I locate the regulating valve or cut-off at the opposite end of pipe J, as illustrated in Figs. 3 and 4, and connect valve M with the bent arm N' of lever N by means of a wire, P, passing through the pipe; valve M being, when closed, seated against an annular rubber packing or gasket clamped around the inner end or mouth of the pipe, within the supply reservoir E. By reversing the position of the bent lever $N N' N^2$ within compartment D, it will be seen that raising of the float will close the inflow of water by pulling on the wire P and thus seating the valve against the mouth of the pipe, within the reservoir E, while the valve is kept normally open by means of a spring, Q. As pipe J is inclined toward the watering device, all water contained in it after the valve has been closed, will run into the float compartment D, so that it will be empty at all times when not actually feeding running water from the reservoir to the tank or watering troughs.

Having thus described my invention, I claim and desire to secure by Letters Patent of the United States—

In a watering trough or tank for live stock, the combination with the compartments communicating with one another, of the float located in one of said compartments, the bail articulated thereto and pivoted to the tank, the supply pipe communicating with said compartment and having an annular packing or gasket projecting beyond its mouth or opening, the bent gravity lever pivotally connected with said pipe and its free end loosely resting on said float and the valve secured to said lever, substantially as described.

In testimony that I claim the foregoing as my own I have hereunto affixed my signature in presence of two witnesses.

GEORGE A. HESS.

Witnesses:
NILL S. REEVE,
F. E. BEATON.